US010491778B2

(12) United States Patent
De Mers et al.

(10) Patent No.: US 10,491,778 B2
(45) Date of Patent: Nov. 26, 2019

(54) APPLYING FEATURES OF LOW-RESOLUTION DATA TO CORRESPONDING HIGH-RESOLUTION DATA

(71) Applicant: Honeywell International Inc., Morris Plains, NJ (US)

(72) Inventors: Robert E. De Mers, Nowthen, MN (US); Kiran Gopala Krishna, Bangalore (IN); Erin Elizabeth Alves, Peoria, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 49 days.

(21) Appl. No.: 15/849,302

(22) Filed: Dec. 20, 2017

(65) Prior Publication Data

US 2019/0089861 A1    Mar. 21, 2019

(30) Foreign Application Priority Data

Sep. 21, 2017  (IN) .............................. 201711033494

(51) Int. Cl.
*H04N 1/32*    (2006.01)
*G06T 11/60*   (2006.01)
*G06F 17/24*   (2006.01)

(52) U.S. Cl.
CPC ......... *H04N 1/32101* (2013.01); *G06T 11/60* (2013.01); *B64C 2201/127* (2013.01); *G06F 17/241* (2013.01)

(58) Field of Classification Search
CPC .............................. H04N 1/32101; G06T 11/60
See application file for complete search history.

(56) References Cited

U.S. PATENT DOCUMENTS

| 7,925,980 B2 | 4/2011 | Bakir et al. |
| 8,102,423 B2 | 1/2012 | Cheng |
| 8,422,832 B2 | 4/2013 | Makadia et al. |
| 8,874,284 B2 | 10/2014 | Sanders-Reed |

(Continued)

FOREIGN PATENT DOCUMENTS

| WO | 2017077543 A1 | 5/2017 |
| WO | 2018123360 A1 | 7/2018 |

OTHER PUBLICATIONS

McCormick, "Taking to the Sky: Integrating Fulcrum & DroneDeploy," Fulcrum—mobile location leverage, Apr. 25, 2017, 16 pp.

(Continued)

*Primary Examiner* — Kabir A Timory
(74) *Attorney, Agent, or Firm* — Shumaker & Sieffert, P.A.

(57) ABSTRACT

In some examples, a method includes receiving, by a computing device, from a remote sensor, a low-resolution version of data and receiving, by the computing device, user inputs for annotating the low-resolution version of the data. In some examples, the method also includes determining, by the computing device, based on the user inputs, one or more annotations to the low-resolution version of the data. In some examples, the method further includes receiving, by the computing device, from the remote sensor, a high-resolution version of the data and automatically applying, by the computing device, the one or more annotations to the high-resolution version of the data.

20 Claims, 6 Drawing Sheets

(56) References Cited

U.S. PATENT DOCUMENTS

| | | |
|---|---|---|
| 8,890,954 B2 | 11/2014 | O'Donnell et al. |
| 8,897,575 B2 | 11/2014 | Ding et al. |
| 8,970,400 B2 | 3/2015 | Vema et al. |
| 9,183,604 B2 | 11/2015 | Lauper et al. |
| 9,251,431 B2 | 2/2016 | Doepke et al. |
| 9,347,792 B2 | 5/2016 | Meeker et al. |
| 9,599,985 B2 | 3/2017 | Wang et al. |
| 9,977,978 B2 | 5/2018 | Coulter et al. |
| 2001/0041021 A1 | 11/2001 | Boyle et al. |
| 2008/0016245 A1 | 1/2008 | Cunningham et al. |
| 2009/0249212 A1 | 10/2009 | Sorensen et al. |
| 2011/0187563 A1 | 8/2011 | Sanders-Reed |
| 2012/0294537 A1 | 11/2012 | Wallace et al. |
| 2014/0006921 A1 | 1/2014 | Gopinath et al. |
| 2016/0295038 A1 | 10/2016 | Rao et al. |
| 2017/0006240 A1 | 1/2017 | Sron |
| 2017/0076438 A1 | 3/2017 | Kottenstette et al. |
| 2017/0118539 A1 | 4/2017 | Lokshin et al. |
| 2017/0200068 A1 | 7/2017 | Cohen et al. |
| 2017/0206648 A1 | 7/2017 | Marra et al. |
| 2017/0293800 A1 | 10/2017 | Babenko et al. |
| 2017/0345459 A1* | 11/2017 | Manville ............. G11B 27/031 |
| 2018/0150962 A1 | 5/2018 | Fletcher et al. |
| 2018/0218533 A1 | 8/2018 | Millin et al. |

OTHER PUBLICATIONS

Elbogen, "Enhancing Field Adjuster Productivity with Annotations and Site Photos," accessed from https://kespry.com/blog/enhancing-field-adjuster-productivity-with-annotations-and-site-photos, Oct. 18, 2017, 22 pp.

Solbrig, et al., "Online Annotation of Airborne Surveillance and Reconnaissance Videos," FOM—Research Institue for Optronics and Pattern Recognition FGAN—Research Establishment for Applied Science Ettlingen, Germany, Sep. 2008, pp. 1131-1138.

U.S. Appl. No. 15/977,624, by Charles T. Bye et al., filed May 11, 2018.

U.S. Appl. No. 16/169,879, by Manik Mahesh Jahagirdar, filed Oct. 24, 2018.

Extended Search Report from counterpart European Application No. 18193315.1, dated Dec. 19, 2018, 11 pp.

Response to Rule 70(2) EPC dated Apr. 1, 2019, and Extended European Search Report and Opinion dated Dec. 19, 2018, from counterpart European application No. 18193315.1, filed Apr. 12, 2019, 21 pp.

* cited by examiner

APPLYING FEATURES OF LOW-RESOLUTION DATA TO CORRESPONDING HIGH-RESOLUTION DATA

This application claims the benefit of India Provisional Patent Application No. 201711033494, filed Sep. 21, 2017, the entirety of which is incorporated herein by reference.

TECHNICAL FIELD

This disclosure relates to synchronization of high- and low-resolution data sets.

BACKGROUND

A remote, high-resolution sensor may be configured to capture and transmit real-time data through a communication channel to a computing device. For example, a user (e.g., a building inspector) may use a remote sensor, such as a camera on an unmanned air vehicle (UAV), to inspect infrastructure like a bridge or a building. The inspector may use a computing device such as a laptop, tablet, mobile phone, etc. for controlling the UAV, capturing images or video taken by the UAV, and for annotating the images or video with electronic notes that document the inspection.

While a computing device may be able to process (e.g., display) high-resolution data being captured by a remote sensor in real-time, the available bandwidth of the communication channel between the computing device and the remote sensor may be insufficient for real-time, high-resolution data transfers.

As such, some remote sensors are configured to locally store high-resolution data and transmit a low-resolution version of the high-resolution data in real-time. Although the computing device is able to receive and process, in near real-time, the low-resolution version of the high-resolution data, the computing device must wait until it is in proximity with the remote sensor to download the locally stored high-resolution data. Accordingly, any annotations or electronic notes taken on the computing device relating to the low-resolution version must be manually applied at a later time to the high-resolution data.

SUMMARY

This disclosure is directed to techniques for enabling a computing device to automatically apply annotations associated with low-resolution data being captured by a remote sensor to corresponding high-resolution data captured by the remote sensor. A device may receive a low-resolution version of high-resolution data that is captured by a remote sensor along with electronic annotations (e.g., markings, text, highlighting, metadata, and the like) applied to the low-resolution data. After separately receiving the corresponding high-resolution data, the device automatically identifies individual portions of the high-resolution data that correspond to parts of the low-resolution data that have annotations. The device then applies the annotations from the low-resolution to the corresponding portions of the high-resolution data.

The details of one or more examples are set forth in the accompanying drawings and the description below. Other features, objects, and advantages will be apparent from the description and drawings, and from the claims.

DETAILED DESCRIPTION

Various examples are described below that enable computing devices or computing systems to automatically apply annotations from low-resolution data to high-resolution data. For example, a computing device may receive low-resolution data (image, video, audio, etc.) from a remote sensor (e.g., in near real-time to as the remote sensor captures the data). The remote sensor may transmit the low-resolution version of data to the computing device via a wireless communication channel. The wireless communication channel may have less capacity than a wired or local communication channel from which the computing device later receives a high-resolution version of the data captured by the remote sensor.

Figure 1:
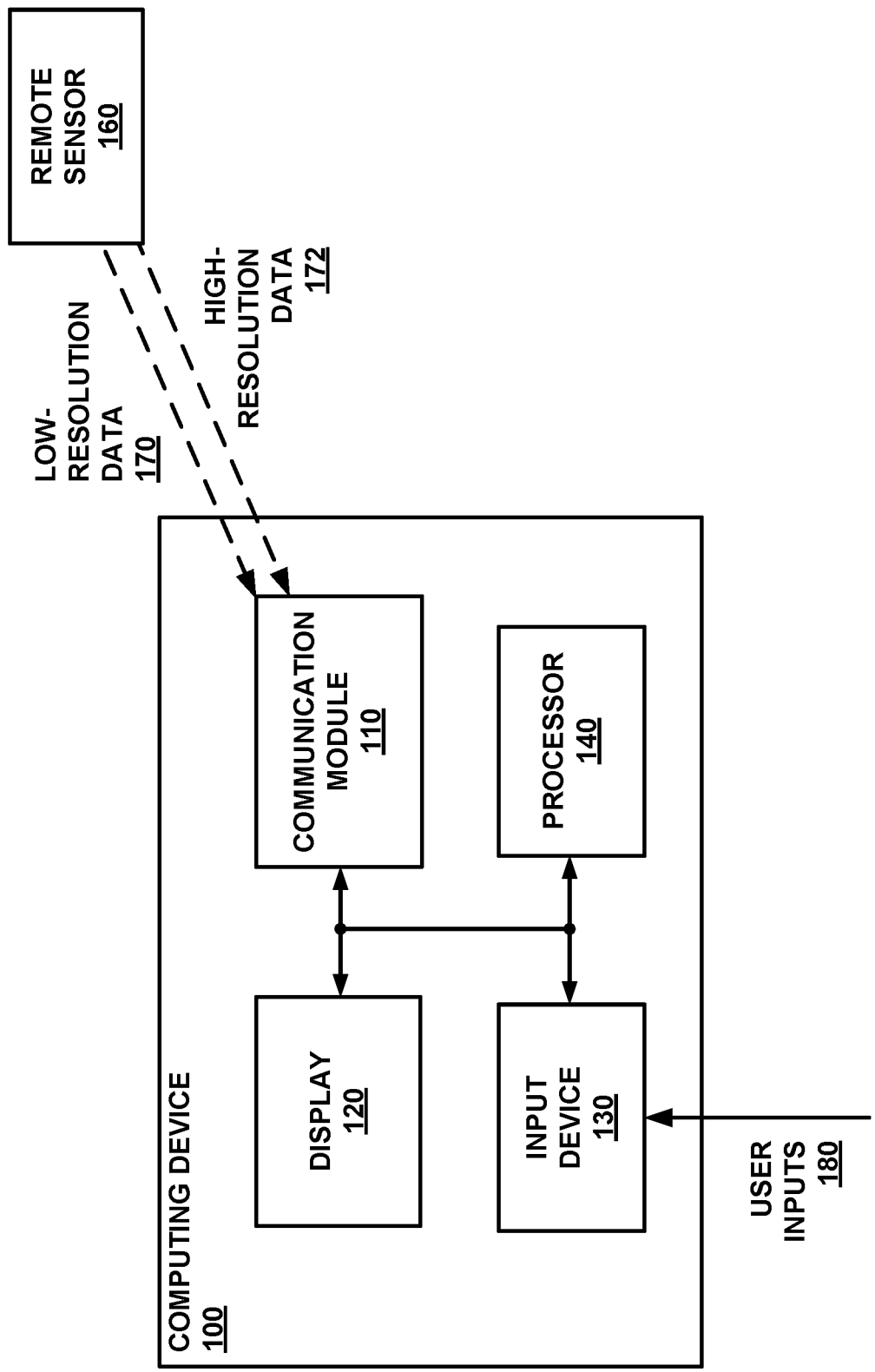
FIG. 1 is a conceptual block diagram of an example system that includes an example computing device configured to exchange data with a remote sensor, in accordance with some examples of this disclosure.

FIG. 1 is a conceptual block diagram of an example system that includes an example computing device configured to exchange data 170 and 172 with a remote sensor 160, in accordance with some examples of this disclosure. FIG. 1 includes computing device 100 communicatively coupled via a link to remote sensor 160. Computing device 100 includes display 120, communication module 110, input device 130 that is configured to receive user inputs 180, and processor 140. Computing device 100 may include a smartphone, a tablet, a laptop computer, a desktop computer, or a server.

Communication module 110 may be configured to receive data 170 and 172 from remote sensor 160, where low-resolution data 170 may include a low-resolution version of data, and high-resolution data 172 may include a high-resolution version of the data. Communication module 110 may receive low-resolution data 170 from remote sensor 160 by a low-capacity communication channel such as a wireless communication channel. The low-capacity communication channel may include Wi-fi, Bluetooth, radio communication, or any other electromagnetic signals. Communication module 110 may receive high-resolution data 172 from remote sensor 160 by a high-capacity communication channel such as a wired connection or a mobile storage device. The wired connection may include universal serial bus (USB) or RS-232. The mobile storage device may include a thumb drive, an SD card, or an external storage device (e.g., solid state memory or a hard drive).

Display 120 may be configured to present data 170 and 172 to a user. For example, display 120 may include a visual presentation of video data or image data. Display 120 may also present sensor data and/or metadata to a user. Display 120 may present the sensor data by presenting text or graphical representations of the sensor readings (temperature, pressure, electrical conductivity, acceleration or other motion, etc.). Computing device 100 may also include a means for projecting audio data to a user, such as speaker(s).

Input device 130 may be configured to receive user inputs 180 for annotating data 170 and/or 172. Input device 130 may include a keyboard, mouse, touchpad, touchscreen, etc. User inputs 180 may include markings on images and video or associations between segments of data 170 and 172 and locations (e.g., associating an image with a location on a bridge). User inputs 180 may include text, highlighting, drawings, and/or voice notes. User inputs 180 may also include metadata such as filenames or notes. The computing device 100, via input device 130, may receive user inputs 180 that cause computing device 100 to annotate or modify low-resolution data 170 while communication module 110 is receiving low-resolution data 170. For instance, the user may annotate low-resolution data 170 by marking or writing on images, making notes on low-resolution data 170, and/or adding or modifying metadata.

Processor 140 may be configured to determine one or more annotations to a low-resolution of data based on user inputs 180. Processor 140 may determine and save the position of a mark or drawing on an image. Processor 140 may also save text or metadata relating to an image. Processor 140 may be configured to transfer annotations relating to user inputs 180 from low-resolution data 170 to high-resolution data 172. Communication module 110 may receive low-resolution data 170 before receiving high-resolution data 172, and display 120 may present low-resolution data 170 to the user. Processor 140 may be configured to store the one or more annotations to a memory device and later transfer user inputs 180 to high-resolution data 172.

Processor 140 may store the annotations in an Extensible Markup Language (XML) file that is associated with low-resolution data 170. In some examples, the annotations may be stored in a text file or any other suitable file format. To automatically apply the annotations to high-resolution data 172, processor 140 may be configured to associate the XML file with the high-resolution data 172. Alternatively, processor 140 may be configured to store the annotations in the same location as low-resolution data 170 (i.e., the file location containing low-resolution data 170). The annotations may be stored in the file containing low-resolution data 170, where the annotations may be a separate layer from the low-resolution data 170. In some examples, the annotations may include markings, highlights, text, scribbling, etc. on an image, and processor 140 may be configured to store the annotations in an image file as a separate layer from the image. Processor 140 may then be configured to transfer or apply the annotations from the file location of low-resolution data 170 to the file location of high-resolution data 172 or into an associated file location (e.g., an XML file).

Processor 140 may be configured to match a segment of low-resolution data 170 (e.g., a low-resolution version of a higher-resolution image) to a segment of high-resolution data 172. Processor 140 may automatically apply the annotations to the high-resolution version of the data after communication. In some examples, before applying the annotations, computing device 100 may be configured to prompt the user for permission to transfer the annotations to the high-resolution version of the data.

The system of this disclosure may reduce user mistakes because computing device 100 may match each segment of low-resolution data 170 to the corresponding segments of the high-resolution data 172. For example, computing device 100 may be configured to match corresponding segments of data using metadata for the segments. Computing device 100 may compare the time-stamps for segments of data. In some examples, if the time stamp for a segment of low-resolution data 170 is within a threshold duration of time (e.g., one second or five hundred milliseconds) of the time stamp for a segment of high-resolution data 172, processor 140 may determine that the segments are versions of the same data. Thus, computing device 100 may match the segments from each data set in order to accurately transfer annotations from low-resolution data 170 to high-resolution data 172.

Computing device 100 may save the annotations on a separate layer from the original data. To transfer the annotations, computing device 100 may first be configured to determine that a segment of high-resolution data 172 matches or corresponds to a segment of low-resolution data 170. For example, computing device 100 may determine a match by determining that a high-resolution image has the same time stamp as a low-resolution image that computing device 100 previously received.

Computing device 100 may then be configured to determine the locations or other characteristics of the annotations. The locations of the annotations may be expressed in a coordinate system based upon a percentage of the distances from two edges of the original image. The annotations may include an anchor point, which may be positioned on an image or a video frame. If the annotation includes a marking, the anchor point may be the center point of the marking, or the anchor point may be the top-left corner of a rectangle around the marking. For example, a mark on an image and/or the anchor point may be located thirty percent from the left edge of the image and sixty percent from the top edge of the image. In another example, a user may annotate low-resolution data 170 to correspond or associate to a location or inspection element, and the computing device may be configured to transfer this annotation to the high-resolution data 172. On downloading the high-resolution data 172, computing device 100 may place the annotation overlay over the high-resolution data 172.

Computing device 100 may then scale the overlay to match the size of the new image, preserving the aspect ratio. For example, processor 140 may be configured to determine the position of an annotation or an anchor point of the annotation relative to an origin point. The origin point may be in the center of an image or at a corner of the image, and processor 140 may be configured to determine the distance from the origin point to the anchor point. Processor 140 may also be configured to determine the relative position of the anchor point in terms of cartesian coordinates or polar coordinates. For example, processor 140 may determine a number of pixels in a horizontal direction and a number of pixels in a vertical direction between the origin point and the anchor point. Alternatively, processor 140 may determine the percentage distances in the horizontal direction and the vertical direction between the origin point and the anchor point, where a percentage distance is the number of pixels that separate two points divided by the total width or height of the image.

Computing device 100 and/or processor 140 may include any suitable arrangement of hardware, software, firmware, instructions, or any combination thereof, to perform the techniques attributed to computing device 100 and/or processor 140 herein. Examples of computing device 100 and/or processor 140 include any one or more microprocessors, digital signal processors (DSPs), application specific integrated circuits (ASICs), field programmable gate arrays (FPGAs), and/or any other equivalent integrated or discrete logic circuitry, as well as any combinations of such components. When computing device 100 and/or processor 140 includes software or firmware, computing device 100 and/or processor 140 further includes any necessary hardware for storing and executing the software or firmware, such as one or more processors or processing units. In some examples, computing device 100 and/or processor 140 may include one or more processors or processing cores.

In general, a processing unit may include one or more microprocessors, DSPs, ASICs, FPGAs, or any other equivalent integrated or discrete logic circuitry, as well as any combinations of such components. Although not shown in FIG. 1, computing device 100 and/or processor 140 may include a memory device and/or a computer-readable storage medium configured to store data. The memory device may include any volatile or non-volatile media, such as a random access memory (RAM), read only memory (ROM), non-volatile RAM (NVRAM), electrically erasable programmable ROM (EEPROM), flash memory, and the like. In some examples, the memory device may be external to computing device 100 and/or processor 140 (e.g., may be external to a package in which computing device 100 and/or processor 140 is housed).

Remote sensor 160 may be configured to capture, gather, and transfer data 170 and 172 to communication module 110. Remote sensor 160 may include a still camera, a video camera, an audio receiver, a temperature sensor, a pressure sensor, an accelerometer, and/or any other conceivable remote sensor. In some examples, remote sensor 160 may be mounted on a vehicle such as an unmanned aerial vehicle (UAV) or drone. Remote sensor 160 may also include a remote camera mounted in a fixed location such as a security camera, a nature camera, etc.

Remote sensor 160 may be configured to transmit low-resolution data 170 through a low-capacity, low-bandwidth, or low-data-rate communication channel. Remote sensor 160 may collect data 170 and 172 at a higher bit rate than the capacity of the low-capacity communication channel between remote sensor 160 and computing device 100. As a result, remote sensor 160 may prioritize data 170 and 172 to transfer to computing device 100 by transmitting low-resolution versions of images, video, or audio. Remote sensor 160 may gather video data and sample images from the video data to transmit to computing device 100. Remote sensor 160 may collect stereo audio data and transmit mono audio to computing device 100.

When a higher-capacity communication channel becomes available, remote sensor 160 may transfer high-resolution data 172 to computing device 100. Remote sensor 160 may include processor configured to store high-resolution data 172 to a memory device. For example, the processor may be configured to store the high-resolution data 172 to a mobile storage device, such as an external memory device or SD card. The processor may transfer high-resolution data 172 to communication module 110 by a wired connection or the mobile storage device. In some examples, the processor may be configured to transfer high-resolution data 172 via a wireless connection after remote sensor 160 has finished collecting data 170 and 172 (e.g., after an inspection is finished).

In accordance with the techniques of this disclosure, processor 140 may be configured to transfer or apply annotations from low-resolution data 170 to high-resolution data 172. The transfer or application may be automatic or in response to user input, but the transfer or application may not require a user to provide inputs for manually transferring individual annotations from low-resolution data 170 to the high-resolution data 172. A user may annotate low-resolution data 170 shortly after computing device 100 receives low-resolution data 170. Then, processor 140 may transfer annotations to high-resolution data 172 with relatively little effort by the user.

The techniques of this disclosure may solve the problem of a user manually transferring the annotations from low-resolution data 170 to later-received high-resolution data 172. The automatic transfer of annotations may take less user time, as compared to the manual transfer of annotations. The techniques of this disclosure may solve this problem by allowing a user (e.g., an inspector) to make notes and markings on the low-resolution data sent to computing device 100 (e.g., the ground station), in real time during an inspection. Computing device 100 may then automatically synchronize these annotations to the high-resolution images when they are downloaded from the remote sensor's SD card.

Computing device 100 may automatically associate high-resolution data to inspection elements based on a user associating the low-resolution data to the inspection elements. First, remote sensor 160 may transmit a timestamp (e.g., time of image capture) and location (latitude, longitude, altitude, heading, camera orientation to three axes) to computing device 100. A processor at the remote sensor may apply the timestamp and location data to the header of the transmission of low-resolution data 170. The software application may use the timestamp information to save low-resolution data 170. Second, the inspector may cause processor 140 to associate low-resolution data 170 to an inspection element. Third, remote sensor 160 may save high-resolution data 172 prefixed with the same timestamp in local storage.

When a synchronization command is initiated, computing device 100 may perform automatic association by using the timestamp information either in the filename of low-resolution data 170 and high-resolution data 172 or in the header section of the data. Computing device 100 may be further configured to validate the association by comparing the location information in both the headers of low-resolution data 170 and high-resolution data 172. If the one or more annotations include an association between low-resolution data 170 and an inspection element, processor 140 may be configured to automatically apply the one or more annotations by associating high-resolution data 172 to the inspection element. In order to automatically transfer annotations to high-resolution data 172, computing device 100 may first create an anchor point for each annotation. If the annotation spans an area on an image, the anchor point may be a center point of the area or a corner point of the area. The anchor point could also be the start point or the end point of the annotation if the annotation is a video or audio annotation.

Second, the anchor point distance, position, or location may be measured with reference to a designated origin point in an image or video frame. Processor 140 may be configured to determine the distance, position, or location in terms of the number of pixels or the percentage of the total image size. For example, the anchor point may be positioned at a horizontal offset of ten percent of the total width of the image, and the anchor point may be positioned at a horizontal offset of ten percent of the total width of the image and at a vertical offset of thirty percent of the total height of the image. Processor 140 may determine the offsets from the origin point, so a vertical offset of ten percent may be measured from the top edge of the image, the center of the image, or the bottom edge of the image. Third, the distance between the origin to each of the anchor points may be saved off in the inspection job file.

Processor 140 may then be configured to automatically apply the annotations to high-resolution data 172. For example, processor 140 may determine a position for an annotation in high-resolution data 172 that corresponds to the position of the annotation in low-resolution data 170. For example, if the annotation is location at the center of a low-resolution image, processor 140 may be configured to automatically apply the annotation to the center of a high-resolution image that matches the low-resolution image.

Figure 2:
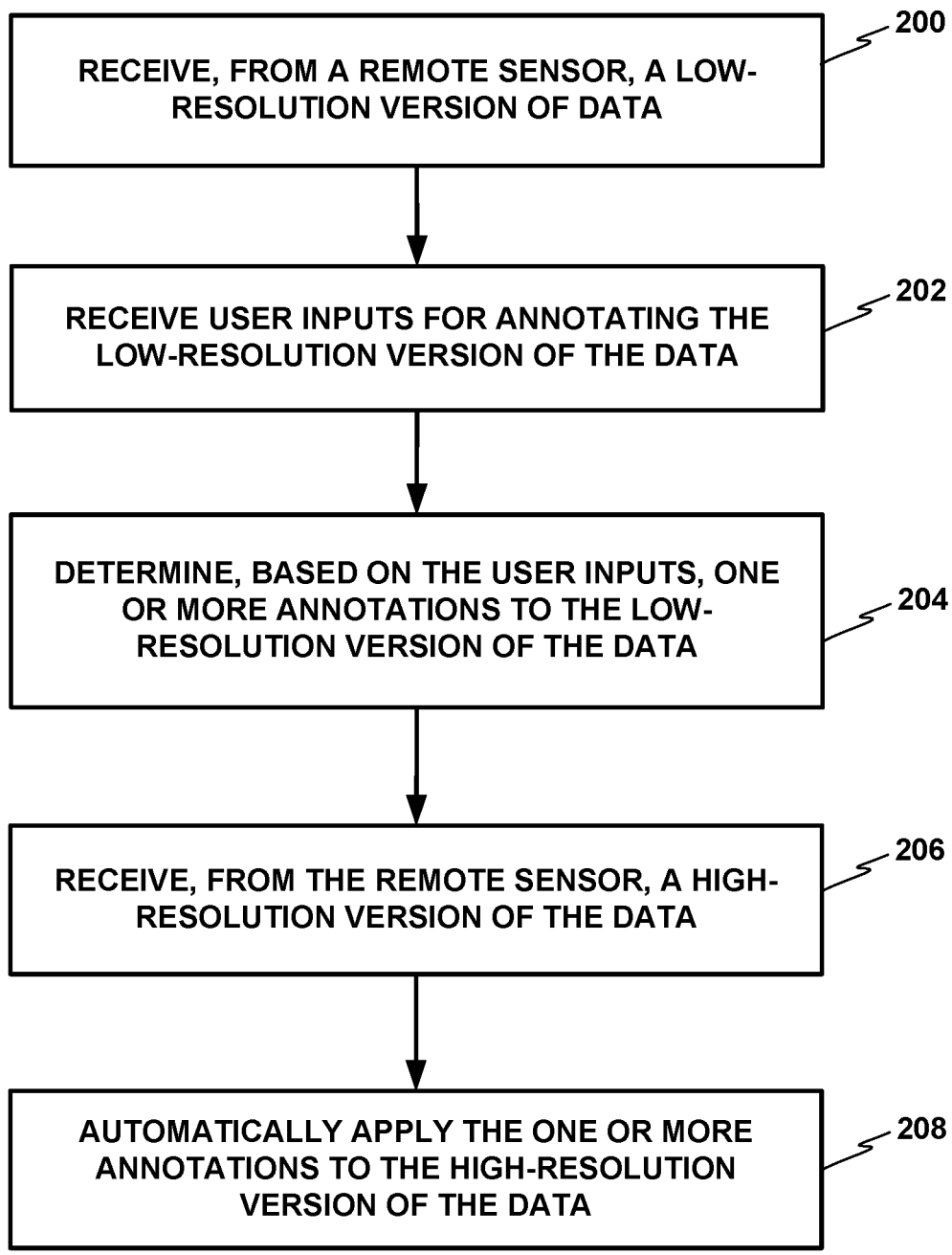
FIG. 2 is a flowchart illustrating example operations of an example computing device configured to apply annotations associated with low-resolution data to corresponding high-resolution data, in accordance with some examples of this disclosure.

FIG. 2 is a flowchart illustrating example operations of an example computing device configured to apply annotations associated with low-resolution data to corresponding high-resolution data, in accordance with some examples of this disclosure. The operations of FIGS. 2-5 are described with reference to computing device 100 of FIG. 1, including communication module 110 and processor 140, although other components may perform similar techniques.

In the example of FIG. 2, communication module 110 receives low-resolution data 170 from remote sensor 160 (200). Low-resolution data 170 may be a low-resolution version of data that is collected by remote sensor 160. In some examples, remote sensor 160 may stream low-resolution video data or send low-resolution versions of images to communication module 110. The link between remote sensor 160 and computing device 100 may not support data rates that are high enough to transfer all of high-resolution data 172 collected by remote sensor 160. Display 120 may present low-resolution data 170 to a user. In some examples, computing device 100 may present low-resolution data 170 as an image, a video, and/or audio. In the example of FIG. 2, input device 130 receives user inputs 180 for annotating low-resolution data 170 (202). User inputs 180 may include annotations such as markings, drawings, changes to visual characteristics of low-resolution data 170 (color, shading, etc.), text notes, and/or changes to metadata. In the example of FIG. 2, processor 140 then determines, based on user inputs 180, one or more annotations to the low-resolution version of the data (204). Processor 140 may be configured to store the one or more annotations to a memory device of computing device 100.

In the example of FIG. 2, communication module 110 receives high-resolution data 172 from remote sensor 160 (206). Communication module 110 may receive high-resolution data 172 after remote sensor 160 finishes gathering data. For example, after an inspection, computing device 100 may retrieve high-resolution data 172 from remote sensor 160 by establishing a wired connection between remote sensor 160 and communication module 110. Eventually, computing device 100 may subsequently receive high-resolution data 172 captured by remote sensor 160 (e.g., after locally downloading high-resolution data 172 directly from remote sensor 160). Rather than requiring the user to provide inputs to transfer the low-resolution annotations to high-resolution data 172, computing device 100 automatically transfers the annotations to high-resolution data 172. In some cases, the user is offered an opportunity to choose whether computing device 100 transfers the annotations and which ones. In any case, computing device 100 identifies portions of low-resolution data 170 and high-resolution data 172 that correspond, and applies the individual annotations made to low-resolution data 170 to similar portions of high-resolution data 172.

In the example of FIG. 2, processor 140 automatically applies the one or more annotations to high-resolution data 172 (208). Processor 140 may be configured to first match segment(s) of low-resolution data 170 to segment(s) of high-resolution data 172 using time stamps or other matching/comparison techniques. Processor 140 may then be configured to apply the one or more annotations to high-resolution data 172 by, for example, determining where a mark is positioned on an image or low-resolution data 170. Processor 140 may determine the position of a mark using the aspect ratio of the image and the relative position of the mark with respect to the side of the image.

During an inspection, a user may cause remote sensor 160 to take many photographs of a specific element. Of these photographs, the user may specifically tag only a few photographs as important to the user (perhaps for inclusion in a final report). The user may then cause computing device 100 to create annotations on those photographs. This is especially applicable in cases where the user wishes to later create a three-dimensional model from the image set. A user may cause computing device 100 to build a three-dimensional model using hundreds of images. After synchronizing, the user may request all of the images associated with a waypoint or an element. The system may return the tagged images at the top of the list. The user may also be able to cause computing device 100 to append other images recorded at the requested location below the tagged pictures.

After a vehicle with remote sensor 160 returns to the base station, the user may cause remote sensor 160 to transfer high-resolution data 172 from the vehicle to computing device 100. The user may transfer high-resolution data 172 to a mobile computing device at the jobsite, or the user may transfer high-resolution data 172 to a desktop machine back at the office. The user may then sort through the images to find the images that are relevant to each infrastructure element. The user may attach these images to the appropriate part of a report document. The user may then annotate an image with text and graphics based upon the user's memory and notes from the actual inspection. However, the user may have already made annotations on low-resolution data 170 on a mobile computing device at the jobsite. Without automatic transfer of annotations, the user may manually transfer the annotations, or the user may attempt to annotate high-resolution data 172 from memory. The techniques of this disclosure may allow the user to cause processor 140 to automatically transfer annotations from low-resolution data 170 to high-resolution data 172. The automatic transfer may reduce the user time in annotating high-resolution data 172 and increase the accuracy and quality of the annotations.

The user may not need to perform any file management tasks in order to apply the annotations to high-resolution data 172. The inspection application may synchronize the data and conduct file transfers. The user may not need to manually locate the SD card in the file structure, open additional windows, drag files to different folders, or delete the files from the SD card so that the SD card is fresh (e.g., has sufficient storage space) for a new inspection. A single command from the user, within the inspection application, may cause the application to perform these tasks. If the SD card stores other data, computing device 100 may be configured to disregard the other data or present the other data to the user to deal with separately. Currently, many remote sensors sequentially store image files with a simple numbering system that could allow photos from different inspections to be mixed.

Figure 3:
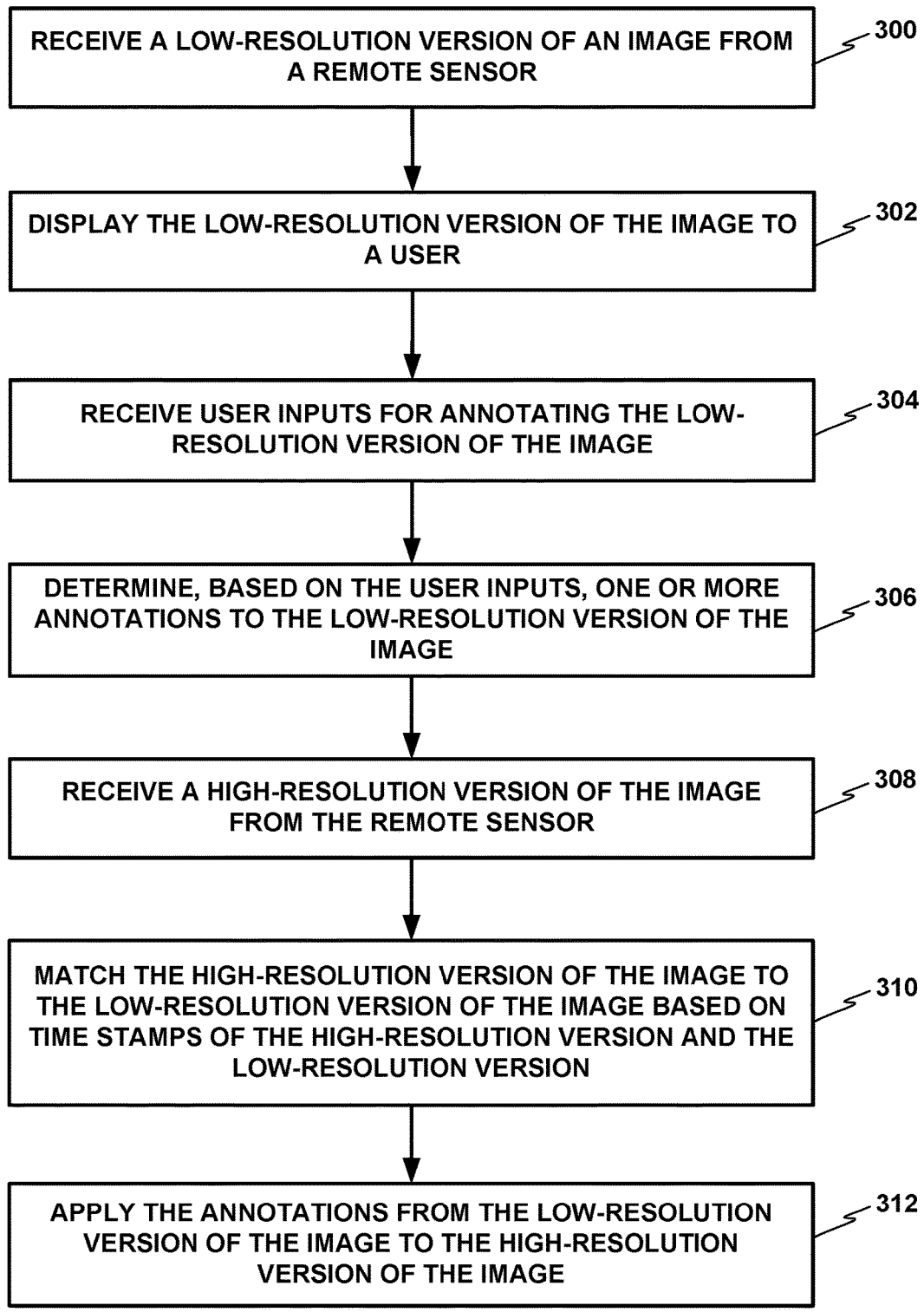
FIG. 3 is a flowchart illustrating example operations of an example computing device configured to automatically apply annotations associated with a low-resolution version of an image to a high-resolution version of the image, in accordance with some examples of this disclosure.

FIG. 3 is a flowchart illustrating example operations of an example computing device configured to automatically apply annotations associated with a low-resolution version of an image to a high-resolution version of the image, in accordance with some examples of this disclosure. FIG. 3 shows an example with image data, but the example techniques of FIG. 3 may also apply to video data, audio data, text data, etc.

In the example of FIG. 3, communication module 110 receives a low-resolution version of an image from remote sensor 160 (300). The low-resolution version may be a compressed or sampled version of the image. For example, a camera on remote sensor 160 may create an image with a file size of approximately one, two, five, or ten megabytes, but the low-resolution version may be only ten, twenty, or one hundred kilobytes. In the example of FIG. 3, display 120 then presents the low-resolution version of the image to a user (302), and input device 130 receives user inputs 180 for annotating the low-resolution version of the image from the user (304). Processor 140 then determines, based on user inputs 180, one or more annotations to the low-resolution version of the image (306).

In the example of FIG. 3, communication module 110 receives a high-resolution version of the image from remote sensor 160 (308). Processor 140 matches the high-resolution version of the image to the low-resolution version of the image based on time stamps of the high-resolution version and the low-resolution version (310). Processor 140 may be configured to match data 170 and 172 based on the time stamp of data 170 and the time stamp 172. For example, processor 140 may be configured to determine a temporal difference between the time stamps of data 170 and 172 by subtracting the time in the first time stamp from the time in the second time stamp. Processor 140 may then be configured to determine whether the temporal difference is less than a threshold duration, such as one hundred milliseconds, five hundred milliseconds, one second, two seconds, or any other duration. A small temporal difference may indicate that high-resolution data 172 is the same as low-resolution data 170. If the temporal difference between the two time stamps is less than the threshold duration, processor 140 may match high-resolution data 172 to low-resolution data 170.

Processor 140 may then associate the high-resolution file with the low-resolution file. Processor 140 applies the annotations from the low-resolution version of the image to the high-resolution version of the image (312). Processor 140 may be configured to automatically transfer the annotations after matching the files, or processor 140 may prompt the user to decide whether to transfer the annotations.

The search and identify tasks can be reduced or eliminated from the image handling process. Instead of relying on the inspector's memory to identify an image, the system may be configured to automatically manage image names for images that are tagged to specific elements. The system may use the operator's context to add non-visible annotations to the image. For example, the high-resolution images coming off the vehicle may be automatically linked to the corresponding infrastructure element that was being inspected on the tablet at the time it was taken. Computing device 100 may be configured to automatically transfer some or all of the annotations that were attached to a low-resolution image to a corresponding high-resolution image that computing device 100 receives from the remote sensor.

Figure 4:
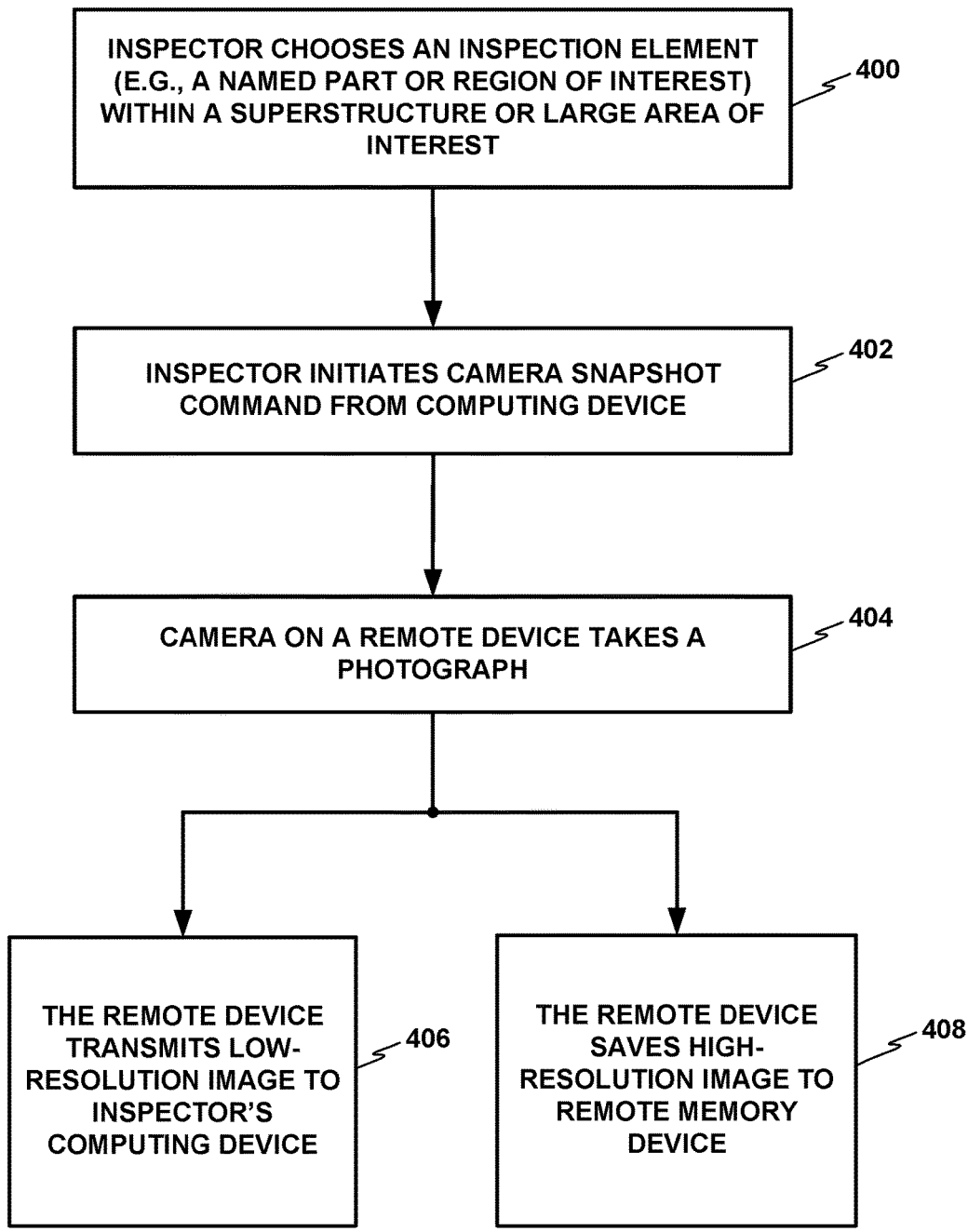
FIG. 4 is a flowchart illustrating example operations of an example system configured to transmit low-resolution data and save high-resolution data, in accordance with some examples of this disclosure.

FIG. 4 is a flowchart illustrating example operations of an example system configured to transmit low-resolution data and save high-resolution data, in accordance with some examples of this disclosure. In the example of FIG. 4, an inspector chooses an inspection element within a superstructure or large area of interest (400). Processor 140 may determine an association between low-resolution data 170 and the inspection element in response to the inspector's choice (i.e., user input 180). Computing device 100 may store a list of inspection elements in an inspection job file, such as a list of fluid tanks, a list of solar panels, or a list of bridge elements. The inspection element may be a pier on a bridge or a solar panel in a utility-scale solar array. The inspector then initiates a camera snapshot command from computing device 100 (402). The camera on the remote device (e.g., a UAV) takes a photograph (404), and the remote device transmits a low-resolution image to computing device 100 (406). A processor on the remote device also saves a high-resolution version of the image to a memory device on the remote device (408).

If position data is available from a UAV including remote sensor 160, then the inspection application that is running on computing device 100 may save the location data and orientation data. Computing device 100 can also use the location data and orientation data to later match photos. On selecting the "synch" function from the inspection application, computing device 100 may locate the SD card file and transfer all files associated with the current inspection. The application may then present the user with a dialogue asking if the user wants to erase the files from the SD card. If the application finds other files on the SD card, the application can present an additional dialogue to let the user deal with the other files.

Within the inspection application, any photos that are specifically tagged by the user may receive an additional flag in the inspection data file, and potentially on the stored image on the SD card in the remote sensor. The application may later use these tags to sort the high-resolution data when viewed later by the inspector (or other user). The application may be configured to present the tagged images to the user first (in thumbnail or list form), in order of time tags. Then the application may present the untagged images in order, after the tagged images.

When building a three-dimensional model from recorded images, the application running on computing device 100 may be configured to transfer the annotation layers from those images with annotations to the three-dimensional model. In order for computing device 100 to render the data correctly on the three-dimensional model, the application may transfer the position data that is associated with the annotations. A more flexible, but more complex method, uses video analytics to register each annotation with respect to visual features in the image. This way, those same visual features can be used to register the annotations in the three-dimensional model.

Figure 5:
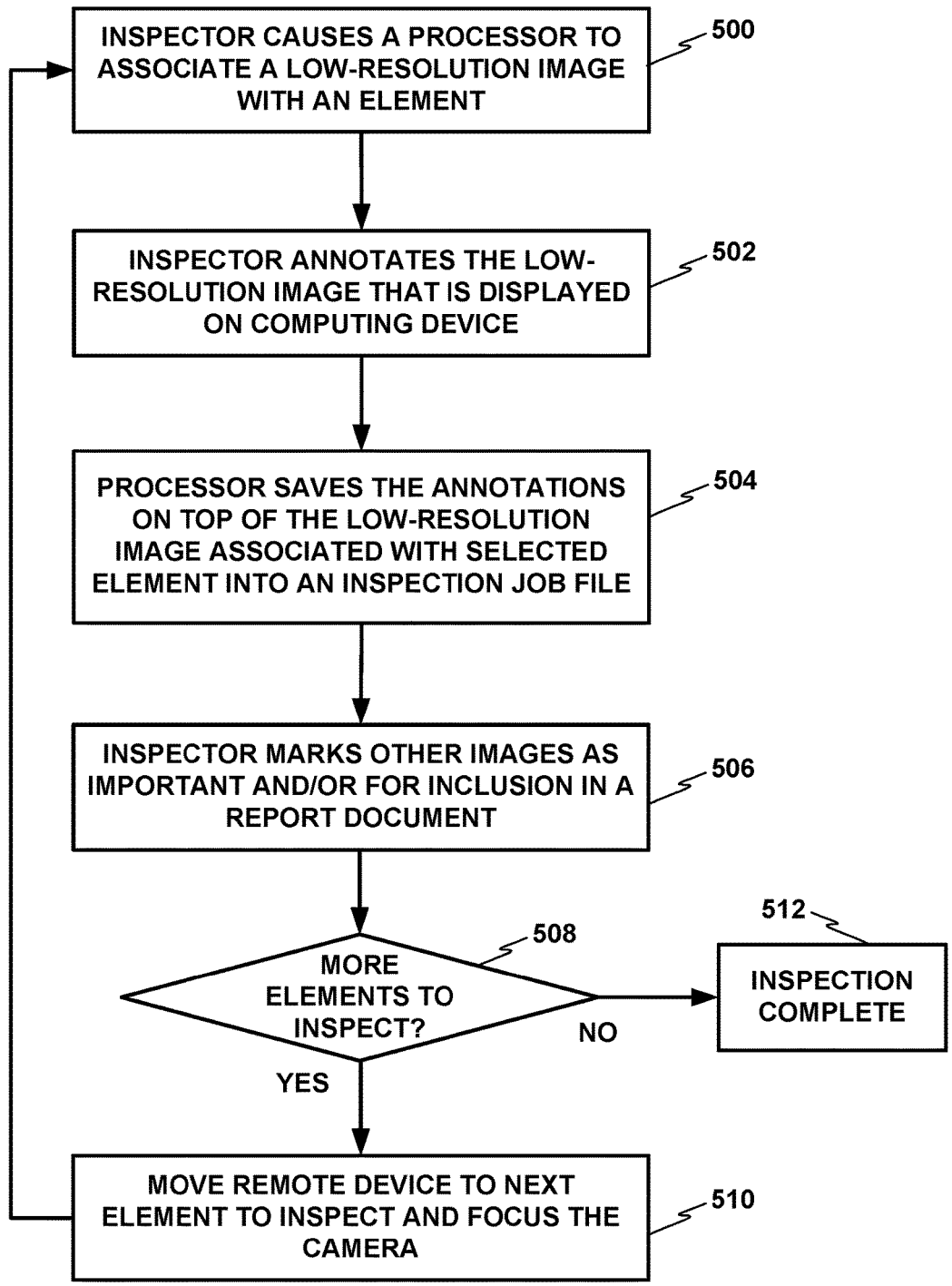
FIG. 5 is a flowchart illustrating example operations of an example computing device configured to create an inspection job file, in accordance with some examples of this disclosure.

FIG. 5 is a flowchart illustrating example operations of an example computing device configured to create an inspection job file, in accordance with some examples of this disclosure. In the example of FIG. 5, the inspector causes processor 140 to associate a low-resolution image with an element (500), and the inspector also annotates the low-resolution image that is displayed on computing device 100 (502). The inspector may use computing device 100 to associate low-resolution images with elements during the inspection. However, the wireless communication channel between remote sensor 160 and computing device 100 may not be sufficient for remote sensor 160 to transfer high-resolution images. Thus, the inspector may not be able to cause processor 140 to associate the high-resolution images to the inspection elements until after the inspection is finished when the inspector can physically access the memory device on the remote sensor 160.

An inspector may use a vehicle, such as a UAV, that includes remote sensor 160 to carry out inspections of solar panels, wind turbines, powerlines, etc. The ease of use may be an important factor in selecting a vehicle and/or sensor. The operator's time is typically the most expensive part of an inspection. The techniques of this disclosure may make a system easier to learn, and faster to operate. Inspectors may be more likely to make detailed annotations, resulting in higher quality inspections. Inspectors may also save a lot of time searching for and identifying images, and creating reports.

In this way, the user can annotate the low-resolution images on a tablet, onsite at the inspection, while the inspector's thoughts are still fresh. And post-landing, the system can synchronize the annotations with the high-resolution images stored on the SD card in a UAV. Arrows, circled areas, audio notes, and text balloons are correctly registered so that they stay associated with the cracks, corrosion, and other infrastructure faults detected during the inspection. The user can then add to or modify the annotations, now that computing device 100 has higher-quality images to display to the user.

If the user uses computing device 100 to create a three-dimensional model of the infrastructure from photographs collected during an inspection, computing device 100 may be configured to transfer the annotations from the two-dimensional images to the three-dimensional model. Computing device 100 may be configured to render the low-resolution images transmitted from remote sensor 160 in the same aspect ratio as the high-resolution images.

In the example of FIG. 5, processor 140 (based on user inputs from the inspector) saves the one or more annotations on top of the low-resolution image associated with the selected element into an inspection job file (504). Processor 140 may store the one or more annotations as a separate layer of data, apart from the image data (e.g., pixel information) that is used to generate output on display 120. The inspector marks other images as important and/or for inclusion in a report document (506). If there are more elements to inspect (508), the inspector provides inputs to the computing device to moves the remote device to the next element to inspect and focus the camera (510). If there are no more elements to inspect, then the inspection is complete (512).

An inspection may be organized around named and numbered elements of infrastructure, such as pier number 3, southernmost bearing. The inspector may use an application to time tag photographs and associate each photograph with an element that is currently displayed in the application. If there is no data transfer from computing device 100 to remote sensor 160 (e.g., mounted on a drone), then computing device 100 may use the time tag to match a streamed low-resolution image to a stored high-resolution image. Computing device 100 (e.g., a tablet) may store the time tag and match up high-resolution data 172 stored on the drone when the drone lands. If some data transfer is possible, then computing device 100 may transmit a more detailed image name to the drone so that a processor on the drone can label the high-resolution image appropriately.

Figure 6A:
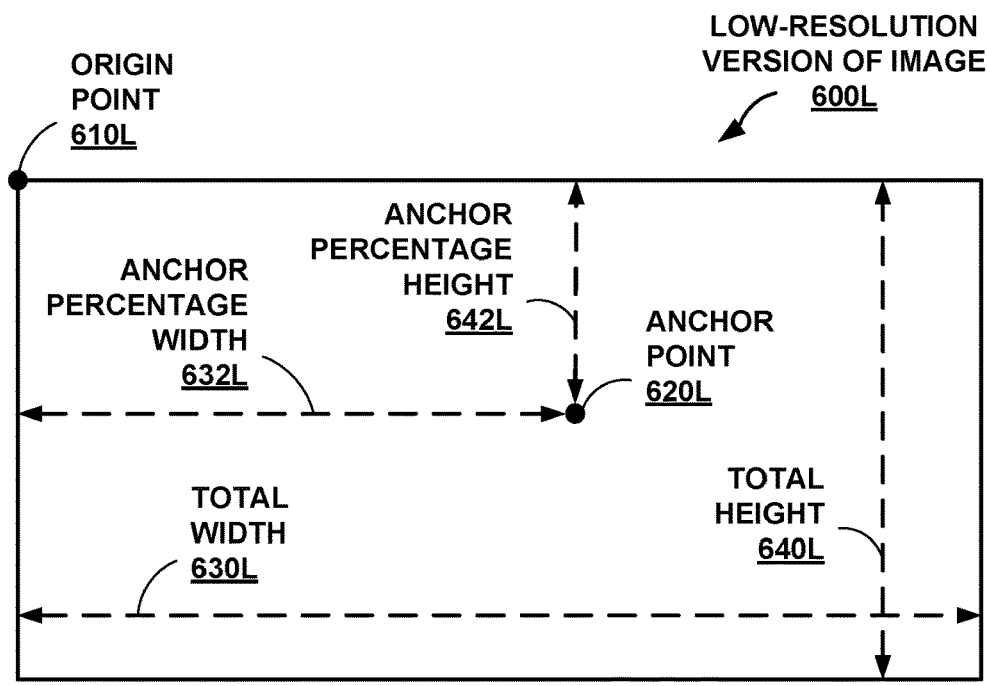
FIGS. 6A and 6B are conceptual diagrams of images that include an anchor point for annotations, in accordance with some examples of this disclosure.
Figure 6B:
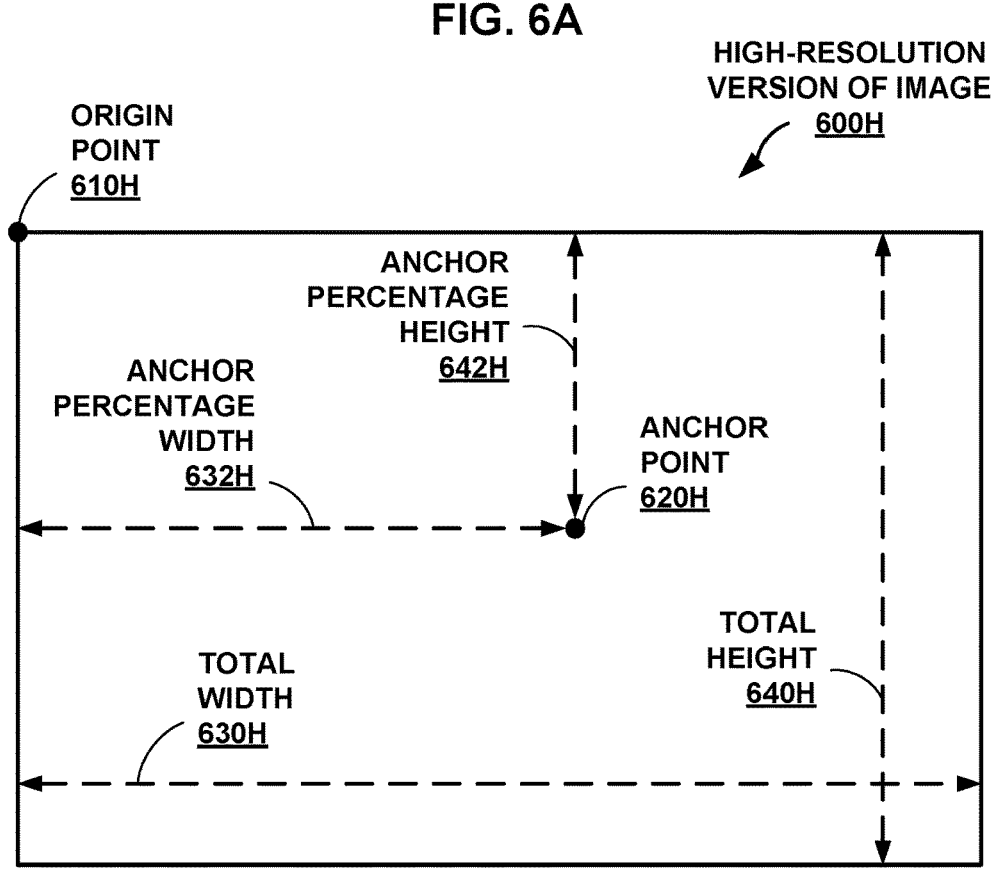

FIGS. 6A and 6B are conceptual diagrams of images 600L and 600H that include an anchor point 620L and 620H for annotations, in accordance with some examples of this disclosure. A remote sensor that includes a camera may capture low-resolution version 600L and high-resolution version 600H. The remote sensor may be configured to transmit low-resolution version of image 600L to a computing device. At a later time, the remote sensor may transmit high-resolution version of image 600H to the computing device.

Between the time of transmission of low-resolution version of image 600L and the time of transmission of high-resolution version of image 600H, a user may annotate image 600L. The annotation may be anchored to image 600L at anchor point 620L. In some examples, the position of anchor point 620L may be the center or the corner of the annotation marking. If the annotation is a marking drawn by the user on image 600L, the processor may be configured to determine the position of anchor point 620L at the top-left corner of the annotation area. For example, the user may create a marking on image 600L that spans from thirty pixels to fifty pixels from the top edge of image 600L and from forty pixels to eighty pixels from the left edge of image 600L. The processor may be configured to determine a position of anchor point 620L at the top left corner of the annotation (i.e., width 632L of forty pixels and height 642L of thirty pixels) or at the center of the annotation (i.e., width 632L of sixty pixels and height 642L of forty pixels).

A processor may be configured to determine the position of anchor point 620L with reference to origin point 610L. FIG. 6A depicts origin point 610L in the top-left corner of image 600L, but the processor may set origin point 610L at any location of image 600L. The processor may be configured to determine anchor percentage width 632L, which is the horizontal offset between origin point 610L and anchor point 620L. The processor may store anchor percentage width 632L as a number of pixels or as a percentage of total width 630L of image 600L, as shown in Equation (1).

$$0 \leq \text{width 632L} \leq \text{total width 630L} \tag{1}$$

$$0 \leq \text{height 642L} \leq \text{total height 640L} \tag{2}$$

Similarly, the processor may be configured to determine anchor percentage height 642L, which is the vertical offset between origin point 610L and anchor point 620L. The processor may store anchor percentage height 642L as a number of pixels or as a percentage of total height 640L, as shown in Equation (2). To apply the annotation from image 600L to image 600H, the processor may be configured to determine a position (e.g., anchor point 620H) on image 600H that corresponds to anchor point 620L on image 600L. Anchor point 620H may be associated with anchor point 620L such that anchor points 620L and 620H are at the same relative position on images 600L and 600H. In some examples, images 600L and 600H may have different aspect ratios, and the processor may use Equations (3)-(6) to determine a corresponding position for anchor point 620H based on the position of anchor point 620L. The heights and widths in Equations (3)-(6) may be expressed in pixels, millimeters, inches, or any other suitable unit.

$$\frac{\text{width 632}H}{\text{total width 630}H} = \frac{\text{width 632}L}{\text{total width 630}L} \tag{3}$$

$$\text{width 632}H = \tag{4}$$
$$\text{width 630}H \times \frac{\text{width 632}L}{\text{width 630}L} = \text{width 632}L \times \frac{\text{width 630}H}{\text{width 630}L}$$

$$\frac{\text{height 642}H}{\text{total height 640}H} = \frac{\text{height 642}L}{\text{total height 640}L} \tag{5}$$

-continued $$\text{height } 642H = \text{height } 640H \times \frac{\text{height } 642L}{\text{height } 640L} = \text{height } 642L \times \frac{\text{height } 640H}{\text{height } 640L} \quad (6)$$

Thus, the processor may be configured to determine a first percentage distance from a first edge of image 600L (e.g., width 632L divided by total width 630L). The processor may then be configured to determine a second percentage distance from a second edge of image 600L (e.g., height 642L divided by total height 640L). The processor may then store the percentage distances to the inspection job file and/or the annotation file (e.g., an XML file). The processor may be further configured to determine horizontal and vertical percentage distances for anchor point 620H based on the percentage distances for anchor point 620L. Using this technique, the annotation on image 600H may be positioned in the same relative position as the annotation on image 600H, even if the resolutions and aspect ratios of images 600L and 600H differ. As a result, the user may not need to manually re-enter the annotation on image 600H because the processor may be configured to automatically apply the annotation from image 600L to image 600H.

The processor may be configured to determine width 632H and height 642H such that the position of anchor point 620H corresponds to the position of anchor point 620L. For example, if a user circles an object in image 600L, the processor may be configured to determine a corresponding position for anchor point 620H and automatically apply the annotation such that image 600H will include a circle around the same object.

The techniques described with respect to FIGS. 6A and 6B may also apply to other types of data, such as video and audio. A processor may be configured to handle each frame of a video file as an image, such that a user can annotate a frame of a low-resolution video file. The processor may then be configured to automatically apply the annotations from a frame of the low-resolution video file to corresponding positions in corresponding frames in a high-resolution video file. In some examples, the frame rate of a low-resolution video file may be lower than the frame rate of the high-resolution video file. Thus, the processor may be configured to apply an annotation from a single frame of the low-resolution video file to multiple frames of the high-resolution video file.

As described herein, a "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., UAV, flying robot, or automated cargo or parcel delivery drone or other craft).

Various illustrative aspects of the disclosure are described above. These and other aspects are within the scope of the following claims.

What is claimed is:
1. A method comprising:
receiving, by a computing device, from a remote sensor, a low-resolution version of data;
receiving, by the computing device, user inputs for annotating the low-resolution version of the data;
determining, by the computing device, based on the user inputs, one or more annotations to the low-resolution version of the data;
receiving, by the computing device, from the remote sensor, a high-resolution version of the data;
matching a particular segment of the low-resolution version of the data to a corresponding segment of the high-resolution version of the data; and
automatically applying, by the computing device, the one or more annotations to the high-resolution version of the data by applying an annotation of the particular segment of the low-resolution version of the data to the corresponding segment of the high-resolution version of the data.

2. The method of claim 1, wherein receiving the low-resolution version of the data comprises receiving the low-resolution version of the data via a wireless communication channel between the computing device and the remote sensor.

3. The method of claim 1, wherein receiving the high-resolution version of the data comprises receiving the high-resolution version of the data from via a wired communication channel between the computing device and the remote sensor.

4. The method of claim 1,
wherein the data comprises an image,
wherein the one or more annotations comprise one or more markings on the low-resolution version of the image,
wherein determining the one or more markings comprises determining a position of the one or more markings on the low-resolution version of the image,
wherein the method further comprises determining a corresponding position on the high-resolution version of the image associated with the position of the one or more markings on the low-resolution version of the image, and
wherein automatically applying the one or more markings to the high-resolution version of the image comprises automatically applying the one or more markings to the corresponding position on the high-resolution version of the image.

5. The method of claim 4,
wherein determining the position of the one or more markings on the low-resolution version of the image comprises:
determining a first percentage distance from a first edge of the low-resolution version of the image to the position of the one or more markings; and
determining a second percentage distance from a second edge of the low-resolution version of the image to the position of the one or more markings; and
wherein determining the corresponding position on the high-resolution version of the image is based on the first percentage distance from a first edge of the high-resolution version of the image and the second percentage distance from a second edge of the high-resolution version of the image.

6. The method of claim 1, further comprising:
determining a first time stamp for the low-resolution version of the data;
determining a second time stamp for the high-resolution version of the data; and
matching the low-resolution version of the data and the high-resolution version of the data based on the first time stamp and the second time stamp.

7. The method of claim 6, further comprising:
determining a temporal difference between the first time stamp and the second time stamp; and
determining that the temporal difference is less than a threshold duration,
wherein matching the low-resolution version of the data and the high-resolution version of the data is further based on determining that the temporal difference is less than the threshold duration.

8. The method of claim 1,
wherein determining the one or more annotations comprises storing the one or more annotations to an Extensible Markup Language file associated with the low-resolution version of the data, and
wherein automatically applying the one or more annotations comprises associating the Extensible Markup Language file with the high-resolution version of the data.

9. The method of claim 1,
wherein determining the one or more annotations to the low-resolution version of the data comprises determining an association between the low-resolution version of the data and an inspection element, and
wherein automatically applying the one or more annotations to the high-resolution version of the data comprises automatically associating the high-resolution version of the data to the inspection element.

10. A computing device comprising:
a communication module configured to:
receive, from a remote sensor, a low-resolution version of data; and
receive, from the remote sensor, a high-resolution version of the data;
an input device configured to receive user inputs for annotating the low-resolution version of the data; and
a processor comprising circuitry configured to:
determine, based on the user inputs, one or more annotations to the low-resolution version of the data;
match a particular segment of the low-resolution version of the data to a corresponding segment of the high-resolution version of the data; and
automatically apply the one or more annotations to the high-resolution version of the data by applying an annotation of the particular segment of the low-resolution version of the data to the corresponding segment of the high-resolution version of the data.

11. The computing device of claim 10,
wherein the communication module is configured to receive the low-resolution version of the data by at least receiving the low-resolution version of the data via a wireless communication channel between the computing device and the remote sensor, and
wherein the communication module is configured to receive the high-resolution version of the data by at least receiving the high-resolution version of the data from via a wired communication channel between the computing device and the remote sensor.

12. The computing device of claim 10,
wherein the circuitry of the processor is configured to determine the one or more annotations by at least determining a position of one or more markings on a low-resolution version of an image,
wherein the circuitry of the processor is further configured to determine a corresponding position on a high-resolution version of the image associated with the position of the one or more markings on the low-resolution version of the image, and
wherein the circuitry of the processor is further configured to automatically apply the one or more annotations to the high-resolution version of the data by at least automatically applying the one or more markings to the corresponding position on the high-resolution version of the image.

13. The computing device of claim 12,
wherein the circuitry of the processor is configured to determine the position of the one or more markings on the low-resolution version of the image by at least:
determining a first percentage distance from a first edge of the low-resolution version of the image to the position of the one or more markings; and
determining a second percentage distance from a second edge of the low-resolution version of the image to the position of the one or more markings; and
wherein the circuitry of the processor is configured to determine the corresponding position on the high-resolution version of the image based on the first percentage distance from a first edge of the high-resolution version of the image and the second percentage distance from a second edge of the high-resolution version of the image.

14. The computing device of claim 10, wherein the circuitry of the processor is further configured to:
determine a first time stamp for the low-resolution version of the data;
determine a second time stamp for the high-resolution version of the data;
determine a temporal difference between the first time stamp and the second time stamp;
determine that the temporal difference is less than a threshold duration; and
match the low-resolution version of the data and the high-resolution version of the data based on determining that the temporal difference is less than the threshold duration.

15. The computing device of claim 10,
wherein the circuitry of the processor is further configured to store the one or more annotations to an Extensible Markup Language file associated with the low-resolution version of the data, and
wherein the circuitry of the processor is configured to automatically apply the one or more annotations by at least associating the Extensible Markup Language file with the high-resolution version of the data.

16. The computing device of claim 10,
wherein the circuitry of the processor is further configured to determine the one or more annotations to the low-resolution version of the data by at least determining an association between the low-resolution version of the data and an inspection element, and
wherein the circuitry of the processor is configured to automatically apply the one or more annotations to the high-resolution version of the data by at least automatically associating the high-resolution version of the data to the inspection element.

17. A non-transitory computer-readable storage medium comprising instructions that, when executed by circuitry of at least one processor of a computing device, configure the circuitry of the at least one processor to:
determine, based on user inputs, one or more annotations to a low-resolution version of data received from a remote sensor;
match a particular segment of the low-resolution version of the data to a corresponding segment of the high-resolution version of the data; and automatically apply the one or more annotations to a high-resolution version of the data received from the remote sensor by applying an annotation of the particular segment of the low-resolution version of the data to the corresponding segment of the high-resolution version of the data.

18. A method comprising:

receiving, by a computing device, from a remote sensor, a low-resolution version of an image;

receiving, by the computing device, user inputs for annotating the low-resolution version of the image;

determining, by the computing device, based on the user inputs, a position of one or more markings on the low-resolution version of the image by:

determining a first percentage distance from a first edge of the low-resolution version of the image to the position of the one or more markings; and determining a second percentage distance from a second edge of the low-resolution version of the image to the position of the one or more markings;

receiving, by the computing device, from the remote sensor, a high-resolution version of the image;

determining, by the computing device, a corresponding position on the high-resolution version of the image associated with the position of the one or more markings on the low-resolution version of the image based on the first percentage distance from a first edge of the high-resolution version of the image and the second percentage distance from a second edge of the high-resolution version of the image; and automatically applying, by the computing device, the one or more markings to the corresponding position on the high-resolution version of the image.

19. A method comprising:

receiving, by a computing device, from a remote sensor, a low-resolution version of data;

determining a first time stamp for the low-resolution version of the data;

receiving, by the computing device, user inputs for annotating the low-resolution version of the data;

determining, by the computing device, based on the user inputs, one or more annotations to the low-resolution version of the data;

receiving, by the computing device, from the remote sensor, a high-resolution version of the data;

determining a second time stamp for the high-resolution version of the data; and matching the low-resolution version of the data and the high-resolution version of the data based on the first time stamp and the second time stamp; and automatically applying, by the computing device, the one or more annotations to the high-resolution version of the data.

20. A method comprising:

receiving, by a computing device, from a remote sensor, a low-resolution version of data;

receiving, by the computing device, user inputs for annotating the low-resolution version of the data;

determining, by the computing device, based on the user inputs, one or more annotations to the low-resolution version of the data, wherein determining the one or more annotations to the low-resolution version of the data comprises determining an association between the low-resolution version of the data and an inspection element;

receiving, by the computing device, from the remote sensor, a high-resolution version of the data; and automatically associating, by the computing device, the one or more annotations to the high-resolution version of the data, wherein automatically applying the one or more annotations to the high-resolution version of the data comprises automatically associating the high-resolution version of the data to the inspection element.

* * * * *